United States Patent
Balk

(10) Patent No.: US 12,006,155 B2
(45) Date of Patent: Jun. 11, 2024

(54) HELICAL CONVEYOR

(71) Applicant: Ambaflex International B.V., Zwaag (NL)

(72) Inventor: Wouter Balk, Baambrugge (NL)

(73) Assignee: AMBAFLEX INTERNATIONAL B.V., Zwaag (NL)

( * ) Notice: Subject to any disclaimer, the term of this patent is extended or adjusted under 35 U.S.C. 154(b) by 0 days.

(21) Appl. No.: 17/994,262

(22) Filed: Nov. 25, 2022

(65) Prior Publication Data

US 2023/0159277 A1    May 25, 2023

(30) Foreign Application Priority Data

Nov. 25, 2021   (EP) .................................... 21210401

(51) Int. Cl.
  *B65G 17/06*   (2006.01)
  *B65G 21/18*   (2006.01)

(52) U.S. Cl.
  CPC ........... *B65G 17/066* (2013.01); *B65G 21/18* (2013.01); *B65G 2207/24* (2013.01)

(58) Field of Classification Search
  CPC .... B65G 17/066; B65G 21/18; B65G 17/086; B65G 2207/24
  USPC ........................................................ 198/778
  See application file for complete search history.

(56) References Cited

U.S. PATENT DOCUMENTS

| | | | | |
|---|---|---|---|---|
| 3,627,109 A * | 12/1971 | Cabak | ................. | B65G 17/066 198/840 |
| 6,336,551 B1 * | 1/2002 | Balk | ..................... | B65G 21/18 198/852 |
| 7,963,389 B2 * | 6/2011 | Broers | ................... | B65G 21/18 198/838 |
| 9,561,907 B2 * | 2/2017 | Hoang | ................ | B65G 17/066 |
| 9,815,630 B1 | 11/2017 | Coto | | |
| 9,908,711 B2 * | 3/2018 | Balk | ..................... | B65G 39/20 |
| 10,421,612 B1 * | 9/2019 | Langsdorf | ............ | B65G 17/24 |

FOREIGN PATENT DOCUMENTS

| | | |
|---|---|---|
| EP | 3715289 A1 | 9/2020 |
| GB | 2104030 A | 3/1983 |
| WO | 9911547 A1 | 3/1999 |

OTHER PUBLICATIONS

Search report in corresponding European patent application No. 21210401.2 dated Apr. 25, 2022.

* cited by examiner

*Primary Examiner* — Mark A Deuble

(74) *Attorney, Agent, or Firm* — Steven M. Koehler; Westman, Champlin & Kochler, P.A.

(57) ABSTRACT

A helical conveyor for conveying piece goods comprises a frame and an endless conveyor belt which is drivable with respect to the frame along a helical track which extends about a centerline. The conveyor belt comprises discrete supporting members each comprising a substantially rigid slat and a roller. The slats follow a first helical path including a first inclination angle along the first helical path with respect to a base plane extending perpendicularly to the centerline and a second helical path including a second inclination angle along the second helical path with respect to the base plane. Each of the rollers is mounted to the corresponding slat such that the difference of an angle between the rolling direction and the base plane and the second inclination angle is smaller than the difference between the first and second inclination angles.

14 Claims, 3 Drawing Sheets

HELICAL CONVEYOR

BACKGROUND

The discussion below is merely provided for general back-ground information and is not intended to be used as an aid in determining the scope of the claimed subject matter.

The present invention relates to a helical conveyor for conveying piece goods, comprising a frame, an endless conveyor belt which is drivable with respect to the frame along a helical track which extends about a centerline, wherein the conveyor belt comprises discrete supporting members for supporting piece goods which supporting members are movably interconnected and arranged next to each other in a direction along the helical track, wherein each of the supporting members comprises a substantially rigid slat and a roller that is rotatable with respect to the slat about an axis of rotation and the frame comprises a guide surface for guiding the rollers hence forming respective contact locations between the rollers and the guide surface, which guide surface is radially directed away from the centerline, wherein the axis of rotation and the contact location at each of the rollers lie in a roller plane whereas a rolling direction of the roller extends perpendicularly to the roller plane, wherein, under operating conditions, at a first radius with respect to the centerline the slats follow a first helical path including a first inclination angle along the first helical path with respect to a base plane extending perpendicularly to the centerline, about which first helical path the conveyor belt twists and at a second radius with respect to the centerline located at a distance from the first radius the slats follow a second helical path including a second inclination angle along the second helical path with respect to the base plane, wherein the first and second inclination angles are different, wherein of each supporting member an intersection between the axis of rotation and a plane extending perpendicularly to the axis of rotation in which plane also lies the contact location is located at the second radius.

The rollers which are guided along the radially directed guide surface serve to create low friction between the conveyor belt and the frame under operating conditions.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in deter-mining the scope of the claimed subject matter. The claimed subject matter is not limited to implementations that solve any or all disadvantages noted in the Background.

A helical conveyor herein disclosed has rollers each of which is mounted to the corresponding slat such that the difference of an angle between the rolling direction and the base plane and the second inclination angle is smaller than the difference between the first and second inclination angles.

An advantage of this design is that an angle between the rolling directions of the respective rollers and the direction of travelling of their axes of rotation along the guide surface is minimized, which minimizes slip.

The conveyor belt twists about the first helical path which is followed by the slats at the first radius. Twist of the conveyor belt is a natural characteristic of a conveyor belt that follows a helical track. The location of the first radius may depend on locations where the supporting members are supported and the way of driving the conveyor belt with respect to the frame. The first radius may extend between an inner curve and outer curve of the conveyor belt within the helical track, but it may also be located at the inner or outer curve.

If the second radius lies between the centerline and the first radius the second inclination angle will be larger than the first inclination angle, i.e. the rolling direction will be steeper, and if the second radius lies beyond the first radius as seen from the centerline the second inclination angle will be smaller than the first inclination angle, i.e. the rolling direction will be less steep.

The difference of an angle between the rolling direction and the base plane and the second inclination angle may be smaller than a half or a quarter of the difference between the first and second inclination angles.

In a preferred embodiment the difference of the angle between the rolling direction and the base plane and the second inclination angle is substantially zero, since the rolling direction of the rollers and the direction of travelling of their axes of rotation along the guide surface are aligned.

The slats may be elongated in a direction which extends transversely to the helical track. The slats may be tapered such that they converge from an outer curve of the conveyor belt to a an inner curve of the conveyor belt.

The supporting members may be interconnected through an endless member such as a chain or a cable to which the discrete supporting members are mounted. It is also conceivable that the slats are directly coupled to each other, such as in case of a modular conveyor mat.

The slats may have substantially flat upper surfaces, wherein the upper surfaces of neighboring slats at the first radius are substantially aligned along the first helical path. The substantially flat upper surfaces create a more or less smooth twisted common upper surface, including limited obstacles. However, at a distance from the first radius, i.e. at the second radius, the upper surfaces of neighboring slats are staggered with respect to each other in a direction along the centerline.

The axis of rotation at each supporting member may be angled with respect to a plane extending perpendicularly to the upper surface and in longitudinal direction of the slat.

The slats may also have substantially flat lower surfaces.

In practice the slats may be plate-shaped.

In an embodiment each of the rollers is mounted to the corresponding slat such that the angle between the rolling direction and the base plane is adjustable.

Each of the rollers may be mounted to the corresponding slat through a roller suspension which is rotatably mounted to the slat about a steering axis which extends transversely, preferably perpendicularly, to the guide surface.

In a particular embodiment the roller and roller suspension form a swivel caster. This serves to automatically align the rolling direction of the rollers and the direction of travelling of their axes of rotation along the guide surface. For this reason the swivel caster includes a small amount of offset distance between the axis of rotation and the steering axis.

The frame may be provided with a supporting guide for guiding the rollers along the second helical path. The supporting guide may urge the rollers in a direction such that their rolling directions and the direction of travelling of their axes of rotation along the guide surface are aligned.

In an embodiment the guide surface is parallel to the centerline and the axis of rotation lies at the second radius.

BRIEF DESCRIPTION OF THE DRAWINGS

Aspects of the invention will hereafter be elucidated with reference to very schematic drawings showing an embodiment by way of example.

DETAILED DESCRIPTION

Figure 1:
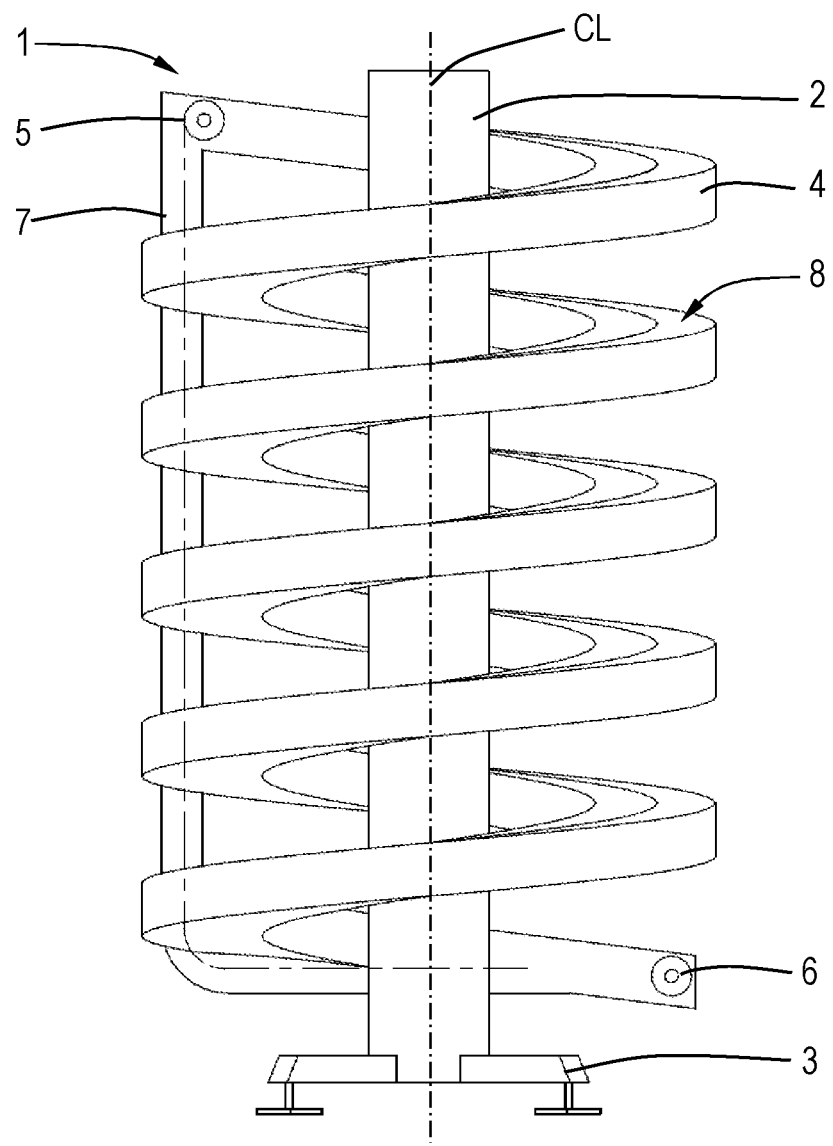
FIG. 1 is a side view of an embodiment of a helical conveyor.

FIG. 1 shows an embodiment of a helical conveyor 1 for conveying piece goods in vertical direction. The helical conveyor 1 comprises a frame including an upright column 2 having feet 3 and a helical guide chute 4 extending around the column 2 and fixed thereto. End pulleys 5, 6 are provided at upper and lower ends of the helical guide chute 4, respectively. Between these ends of the helical guide chute 4 a return chute 7 of the frame extends outside the helical guide chute 4.

The helical conveyor 1 comprises an endless conveyor belt 8, which is drivable along the helical guide chute 4 and the return chute 7 in a direction of conveyance, for example through an electric motor (not shown) which drives one of the end pulleys 5, 6. Along the helical guide chute 4 the conveyor belt 8 follows a helical track which extends about a vertical centerline CL.

Figure 2:
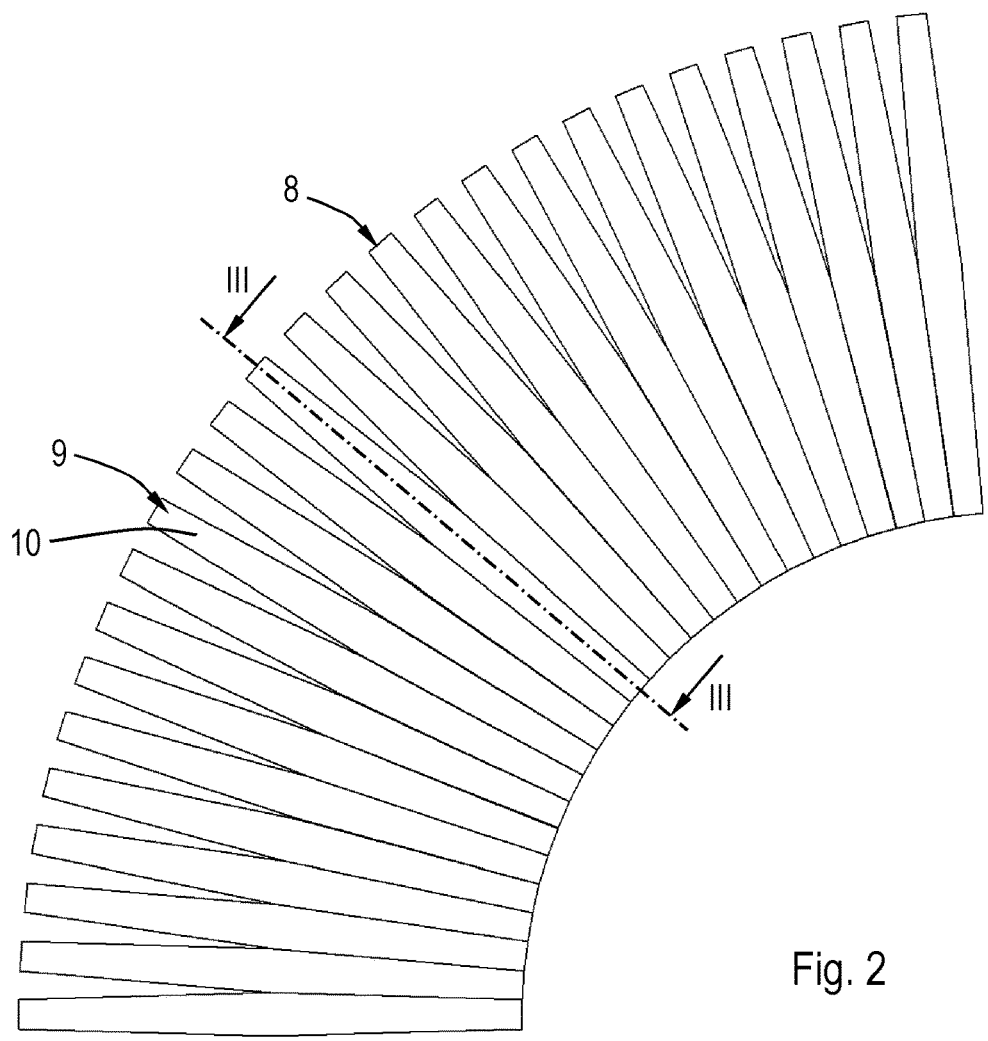
FIG. 2 is an enlarged plan view of a part of the helical conveyor as shown in FIG. 1, showing a portion of a conveyor belt.

Referring to FIG. 2 the conveyor belt 8 comprises a plurality of discrete supporting members 9 for supporting piece goods. The supporting members 9 are movably coupled to each other and they are arranged next to each other in the direction of conveyance, i.e. in a direction along the helical track. Each of the supporting members 9 comprises a substantially rigid slat 10, which may be made of plastic, see FIG. 3. This means that its tendency to bend or twist is limited. In this case the slats 10 are plate-shaped and elongated in a direction which extends transversely to the direction of conveyance. Each of the slats 10 is slightly tapered from its centre to its opposite ends in longitudinal direction as seen from above. The slats 10 have also substantially flat upper surfaces 11 and substantially flat lower surfaces 12. It is noted, however, that numerous alternative shapes of the slats 10 are conceivable.

The helical guide chute 4 has an inner support section 13 and an outer support section 13' which extend parallel to each other. The inner support section 13 is located closer to the centerline CL than the outer support section 13'. The inner and outer support sections 13, 13' have respective inner and outer upper support surfaces 14, 14' on which the slats 10 rest so that the slats 10 are slidingly supported by the inner and outer upper support surfaces 14, 14' when the conveyor belt 8 moves in the direction of conveyance. In an alternative embodiment the supporting members 9 may be provided with additional rollers which run on the inner and outer upper support surfaces 14, 14'.

Figure 3:
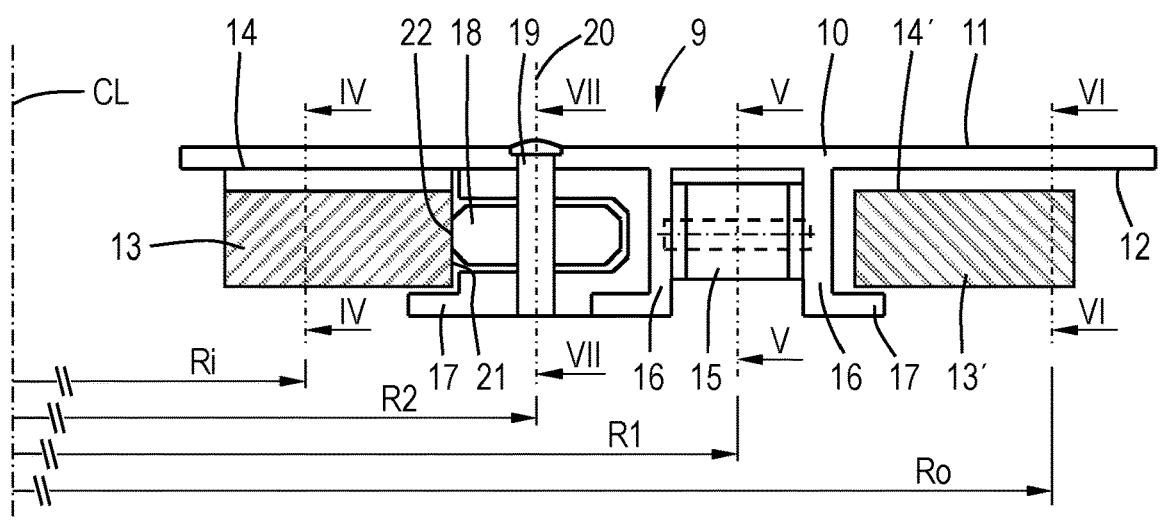
FIG. 3 is a view along the line III-III in FIG. 2.

FIG. 3 shows that the supporting members 9 are interconnected by an endless chain 15. Vertical flanges 16 which project downwardly from each slat 10 are mounted to the chain 15. Alternatively, the supporting members 9 may be interconnected through a different endless member such as a cable. It is also conceivable that the slats 10 are directly coupled to each other. Each of the supporting members 9 also comprises outwardly pointing projections 17 at a distance from the lower surfaces 12 of the slats 10, which projections 17 serve to engage under the support sections 13 so as to prevent the supporting members 9 from moving upwardly away from the upper support surfaces 14.

Furthermore, FIG. 3 shows that the supporting member 9 is provided with a roller 18. The roller 18 is mounted to the slat 10 via a rotary shaft 19 such that it is rotatable with respect to the slat 10 about an axis of rotation 20. The inner support section 13 comprises a guide surface 21 for guiding the rollers 18 of the respective support members 9. The guide surface 21 is radially directed away from the centerline CL. The rollers 18 are supported by the guide surface 21 at respective contact locations 22. The axis of rotation 20 and the contact location 22 at each of the rollers 18 lie in a roller plane whereas a rolling direction of the roller 18 extends perpendicularly to the roller plane.

Figure 4:
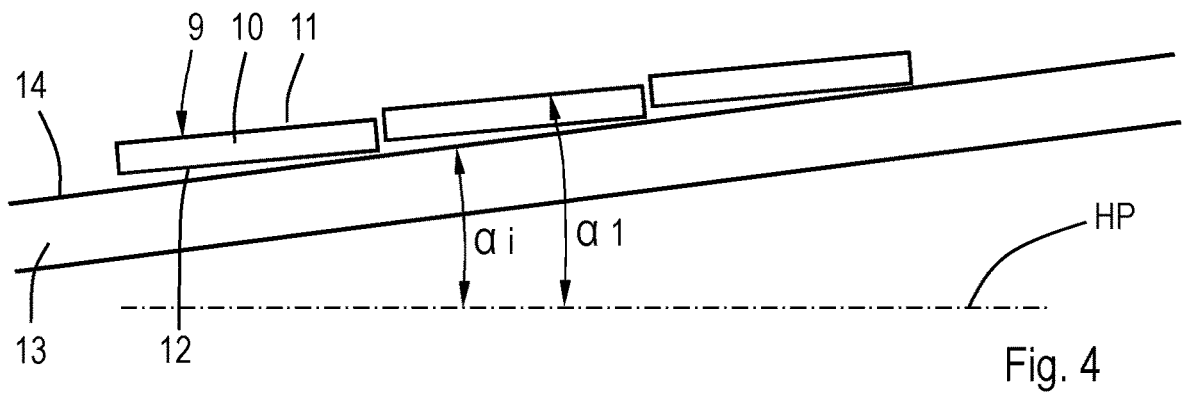
FIGS. 4-6 are views along the lines IV-IV, V-V and VI-VI in FIG. 3, respectively.
Figure 5:
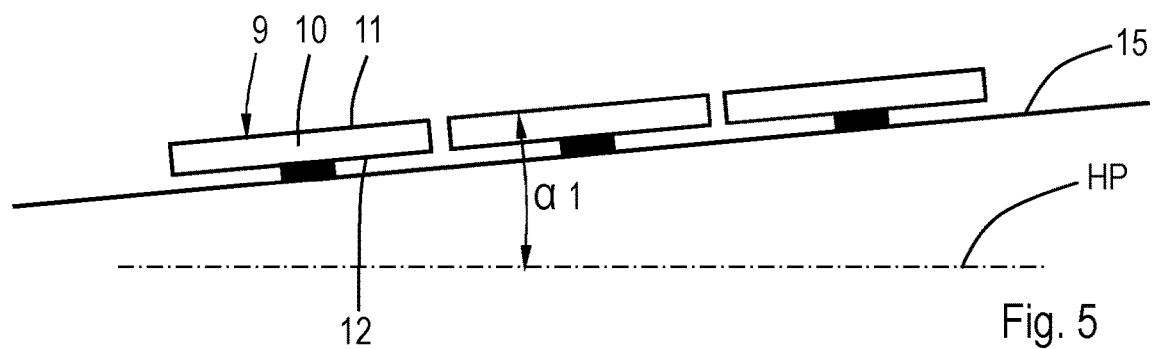
Figure 6:
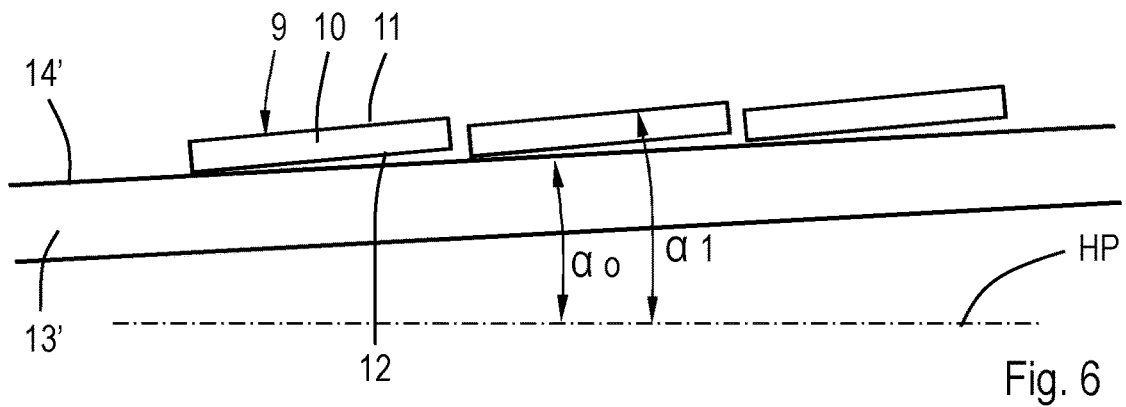

As described hereinbefore, the conveyor belt 8 follows a helical track at the helical guide chute 4 under operating conditions. However, an inner curve of the conveyor belt 8 follows a steeper inclination angle with respect to a horizontal plane HP than an outer curve of the conveyor belt 8, which is illustrated in FIGS. 4-6. These figures show very schematic cross-sectional views of three successive supporting members 9 at three different distances from the centerline CL. For explanatory reasons the inner and outer upper support surfaces 14, 14' and the chain 15 are depicted as straight lines but in reality they extend helically.

FIG. 5 shows the orientations of the successive slats 10 at a first radius R1 where the supporting members 9 are mounted to the chain 15. At the first radius R1 the upper surfaces 11 of the neighboring slats 10 are substantially aligned along a first helical path that they follow. The conveyor belt 8 twists about the first helical path. The upper surfaces 11 of the slats 10 are angled along the first helical path with respect to the horizontal plane HP by the first inclination angle α1.

FIG. 4 shows the orientations of the neighboring slats 10 at an inner radius Ri at the inner support section 13, which inner radius Ri is smaller than the first radius R1 and FIG. 6 shows the orientations of the neighboring slats 10 at an outer radius Ro at the outer support section 13', which outer radius Ro is larger than the first radius R1. Since the slats 10 are substantially rigid the orientations of cross-sections of each slat 10 at the first radius R1, the inner radius Ri and the outer radius Ro are the same. For that reason the respective upper surfaces 11 of the slats 10 form the same first inclination angle α1 with respect to the horizontal plane HP, see FIGS. 4-6.

As described hereinbefore, the inner curve of the conveyor belt 8 follows a steeper inclination angle with respect to the horizontal plane HP than the outer curve of the conveyor belt 8. This means that an inner helical path which is followed by the slats 10 at the inner radius Ri, i.e. on the inner upper support surface 14, has an inner inclination angle αi with respect to the horizontal plane HP which is larger than the first inclination angle α1, whereas an outer helical path which is followed by the slats 10 at the outer radius Ro, i.e. on the outer upper support surface 14', has an outer inclination angle αo with respect to the horizontal plane HP which is smaller than the first inclination angle α1. Consequently, the upper surfaces 11 of the neighboring slats 10 at the inner radius Ri and the outer radius Ro are not aligned, but staggered with respect to each other in a direction along the centerline CL, see FIGS. 4 and 6. Hence, the upper surfaces 11 of neighboring slats 10 do not form a common flat surface.

FIGS. 4 and 6 illustrate that due to the flat lower surfaces 12 of the slats 10 they only partly rest on the inner and outer support surfaces 14, 14'. However, if heavy piece goods are placed on the supporting members 9 the slats 10 may twist about respective longitudinal axes thereof such that they entirely rest on the inner and/or outer upper support surfaces 14, 14'.

It is noted that for explanatory reasons it is assumed that at the location of the chain 15 the upper surfaces 11 of the slats 10 are substantially aligned, but this location may be at a different radius with respect to the centerline CL. It is also possible that the upper surfaces 11 of the neighboring slats 10 are not exactly aligned, but there will be a radius with respect to the centerline CL where staggering of the upper surfaces 11 of neighboring slats 10 with respect to each other in a direction along the centerline CL is smallest.

At each supporting member 9 an imaginary plane extending perpendicularly to the axis of rotation 20, in which plane also lies the contact location 22, intersects the axis of rotation 20 at a second radius R2 with respect to the centerline CL. Since in the embodiment as shown in FIG. 3 the guide surface 21 is parallel to the centerline CL the axes of rotation 20 lie at the second radius R2. At the second radius R2 the upper surfaces 11 of neighboring slats 10 follow a second helical path which has a second inclination angle $\alpha 2$ along the second helical path with respect to the horizontal plane, see FIGS. 3 and 7. Each of the rollers 18 is mounted to the corresponding slat 10 such that an angle between the rolling direction, which is indicated by reference sign R in FIG. 7, and the horizontal plane HP, on the one hand, and the second inclination angle $\alpha 2$, on the other hand, is substantially zero. Consequently, the rollers 18 are aligned with the direction of travelling of the corresponding axes of rotation 20 along the guide surface 21 such that friction is minimized. In the embodiment as shown in FIG. 3 the axes of rotation 20 are located between the centerline CL and the first radius R1 where the centres of the slats 10 are located but they may also be located beyond the first radius R1 as seen from the centerline CL.

Figure 7:
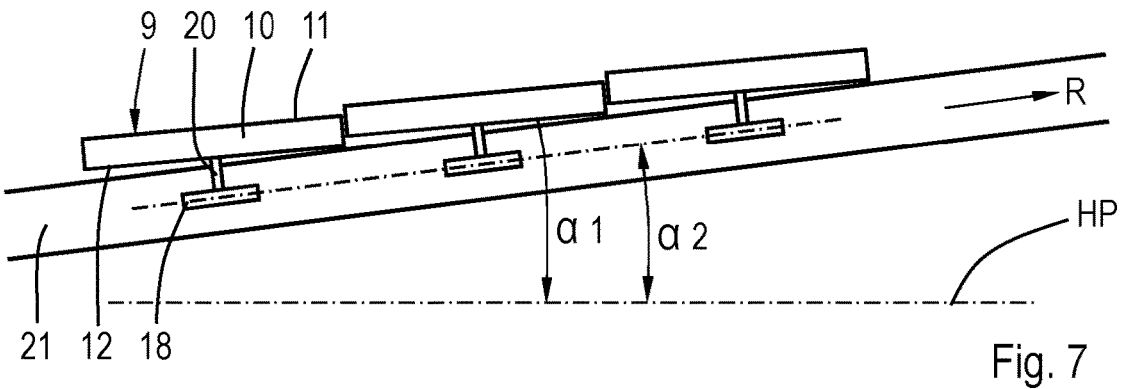
FIG. 7 is a similar view as FIGS. 4-6, but showing a view along the line VII-VII in FIG. 3.

FIG. 7 shows that the axis of rotation 20 of each supporting member 9 is angled with respect to a plane extending perpendicularly to the upper surface 11 and in longitudinal direction of the slat 10. If the rollers 18 were mounted to the slats 10 in a conventionally manner such that the axis of rotation 21 would lie in the mentioned plane, i.e. perpendicularly to the upper surfaces 11 of the respective slats 10, there would be a slip angle between the rolling direction R and the direction of travelling of the axis of rotation 20 along the second helical path, hence introducing slip. For that reason, the slip angle should be as small as possible, i.e. smaller than the difference between the first inclination angle $\alpha 1$ and the second inclination angle $\alpha 2$.

In an alternative embodiment (not shown) each of the rollers is mounted to the corresponding slat such that the angle between the rolling direction and the second inclination angle is adjustable. This provides the opportunity to set the angle such that it fits to the actual direction of travelling of the rollers along the guide surface.

In another alternative embodiment (not shown) each of the rollers is mounted to the corresponding slat through a roller suspension which is rotatably mounted to the slat about a steering axis which extends perpendicularly to the guide surface. If the roller and roller suspension are adapted such that they form a swivel caster the roller can automatically align with its direction of travelling.

There may also be a supporting guide (not shown) along the guide surface 21 which guides the rollers 18 along the second helical path.

The invention is not limited to the embodiment shown in the drawings and described hereinbefore, which may be varied in different manners within the scope of the claims and their technical equivalents. For example, the supporting members may be provided with rollers which run on the inner and outer upper support surfaces to minimize friction between the slats and the inner and outer upper support surfaces. It is also conceivable that the guide surface is angled with respect to the centerline within a radial plane in which the centerline lies, whereas the axes of rotation of the rollers are substantially parallel to the guide surface.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims.

What is claimed is:
1. A helical conveyor for conveying piece goods, comprising:
   a frame; and
   an endless conveyor belt which is drivable with respect to the frame along a helical track which extends about a centerline (CL), wherein the conveyor belt comprises discrete supporting members for supporting piece goods which supporting members are movably interconnected and arranged next to each other in a direction along the helical track, wherein each of the supporting members comprises a substantially rigid slat and a roller that is rotatable with respect to the slat about an axis of rotation and the frame comprises a guide surface for guiding the rollers hence forming respective contact locations between the rollers and the guide surface, which guide surface is radially directed away from the centerline (CL), wherein the axis of rotation and the contact location at each of the rollers lie in a roller plane whereas a rolling direction (R) of the roller extends perpendicularly to the roller plane, wherein, under operating conditions, at a first radius (R1) with respect to the centerline (CL) the slats follow a first helical path including a first inclination angle ($\alpha 1$) along the first helical path with respect to a base plane (HP) extending perpendicularly to the centerline (CL), about which first helical path the conveyor belt twists and at a second radius (R2) with respect to the centerline (CL) located at a distance from the first radius (R1) the slats follow a second helical path including a second inclination angle ($\alpha 2$) along the second helical path with respect to the base plane (HP), wherein the first and second inclination angles ($\alpha 1$, $\alpha 2$) are different, wherein of each supporting member an intersection between the axis of rotation and a plane extending perpendicularly to the axis of rotation in which plane also lies the contact location is located at the second radius (R2), and wherein each of the rollers is mounted to the corresponding slat such that the difference of an angle between the rolling direction (R) and the base plane (HP) and the second inclination angle ($\alpha 2$) is smaller than the difference between the first and second inclination angles (α1, α2).

2. The helical conveyor according to claim 1, wherein the difference of the angle between the rolling direction (R) and the base plane (HP) and the second inclination angle (α2) is substantially zero.

3. The helical conveyor according to claim 2, wherein the slats are elongated in a direction which extends transversely to the helical track.

4. The helical conveyor according to claim 1, wherein the slats are elongated in a direction which extends transversely to the helical track.

5. The helical conveyor according to claim 1, wherein the slats have substantially flat upper surfaces, wherein the upper surfaces of neighboring slats at the first radius (R1) are substantially aligned along the first helical path.

6. The helical conveyor according to claim 5, wherein the slats are elongated in a direction which extends transversely to the helical track, and wherein the axis of rotation at each supporting member is angled with respect to a plane extending perpendicularly to the upper surface and in longitudinal direction of the slat.

7. The helical conveyor according to claim 1, wherein the slats have substantially flat lower surfaces.

8. The helical conveyor according to claim 1, wherein the slats are plate-shaped.

9. The helical conveyor according to claim 1, wherein each of the rollers is mounted to the corresponding slat such that the angle between the rolling direction (R) and the base plane (HP) is adjustable.

10. The helical conveyor according to claim 1, wherein each of the rollers is mounted to the corresponding slat through a roller suspension which is rotatably mounted to the slat about a steering axis which extends transversely, preferably perpendicularly, to the guide surface.

11. The helical conveyor according to claim 10, wherein the roller and roller suspension form a swivel caster.

12. The helical conveyor according to claim 11, wherein the frame is provided with a supporting guide for guiding the rollers along the second helical path.

13. The helical conveyor according to claim 10, wherein the frame is provided with a supporting guide for guiding the rollers along the second helical path.

14. The helical conveyor according to claim 1, wherein the guide surface is parallel to the centerline (CL) and the axis of rotation lies at the second radius (R2).

* * * * *